US011374939B2

(12) United States Patent
Zhu et al.

(10) Patent No.: US 11,374,939 B2
(45) Date of Patent: Jun. 28, 2022

(54) MANAGING APPLICATION CONSTRAINTS ACROSS PLATFORMS

(71) Applicant: Microsoft Technology Licensing, LLC, Redmond, WA (US)

(72) Inventors: Rui Zhu, Sammamish, WA (US); Daniel Martin Strommen, Seattle, WA (US); Irina Petronela Salvan, Redmond, WA (US); Fernando Israel Osorio Cedeno, Kirkland, WA (US); Alec Richard Lindberg, Seattle, WA (US); Thomas Anand Jeyaseelan, Bellevue, WA (US); Mouna Sidi Hida, Redmond, WA (US); Emre Aydinceren, Newcastle, WA (US); Christophe Alain Berthoud, Seattle, WA (US); Vaibhav Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 16/537,566

(22) Filed: Aug. 10, 2019

(65) Prior Publication Data
US 2020/0412739 A1 Dec. 31, 2020

Related U.S. Application Data

(60) Provisional application No. 62/868,956, filed on Jun. 30, 2019.

(51) Int. Cl.
*G06F 21/00* (2013.01)
*H04L 9/40* (2022.01)
(52) U.S. Cl.
CPC ................ *H04L 63/108* (2013.01)

(58) Field of Classification Search
CPC .................... H04L 63/20; H04L 63/108
See application file for complete search history.

(56) References Cited

U.S. PATENT DOCUMENTS 10,019,599 B1 7/2018 Moran et al.
2005/0080898 A1* 4/2005 Block ................ G06F 16/9535
709/225

(Continued)

OTHER PUBLICATIONS

PCT Search Report and Written Opinion for PCT/US2020/031240, dated Jul. 14, 2020, 12 pages.

(Continued)

*Primary Examiner* — Ghazal B Shehni

(57) ABSTRACT

A computer-implemented technique is described herein for defining and applying constraints that regulate a supervisee's interaction with applications. In one implementation, the technique provides a user interface presentation to a supervisor that lists a set of applications that run on plural application execution platforms. The user interface presentation also allows the supervisor to set platform-agnostic constraint information for any identified application. The platform-agnostic constraint information, once set for an application, constrains interaction by a supervisee with all versions of that same application. That is, the constraint information is said to be agnostic with respect to platform in the sense that it applies to a variety of application execution platforms that run the application. In one example, the platform-agnostic constraint information specifies a permitted amount of an activity that the supervisee is permitted to perform across all versions of an application.

19 Claims, 12 Drawing Sheets

(56) References Cited

U.S. PATENT DOCUMENTS

| | | | | |
|---|---|---|---|---|
| 2005/0282559 A1* | 12/2005 | Erskine | ............... | H04M 15/72 |
| | | | | 455/456.4 |
| 2007/0289028 A1* | 12/2007 | Vaughan | ............... | G06F 21/105 |
| | | | | 726/30 |
| 2010/0217837 A1* | 8/2010 | Ansari | ............... | H04W 12/033 |
| | | | | 709/224 |
| 2014/0059144 A1* | 2/2014 | Lehmann | ............... | G06Q 10/10 |
| | | | | 709/206 |

OTHER PUBLICATIONS

"Use parental controls on your child's iPhone, iPad, and iPod touch," available at <<https://support.apple.com/en-us/HT201304>>, Apple Inc., Cupertino, CA, accessed on Jun. 7, 2019, 6 pages.

* cited by examiner

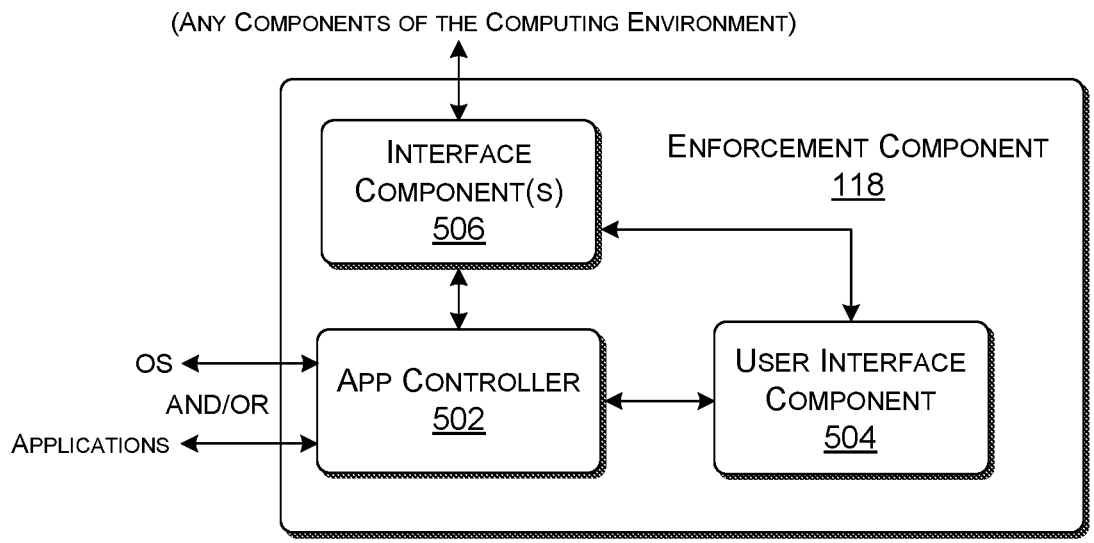
FIG. 5
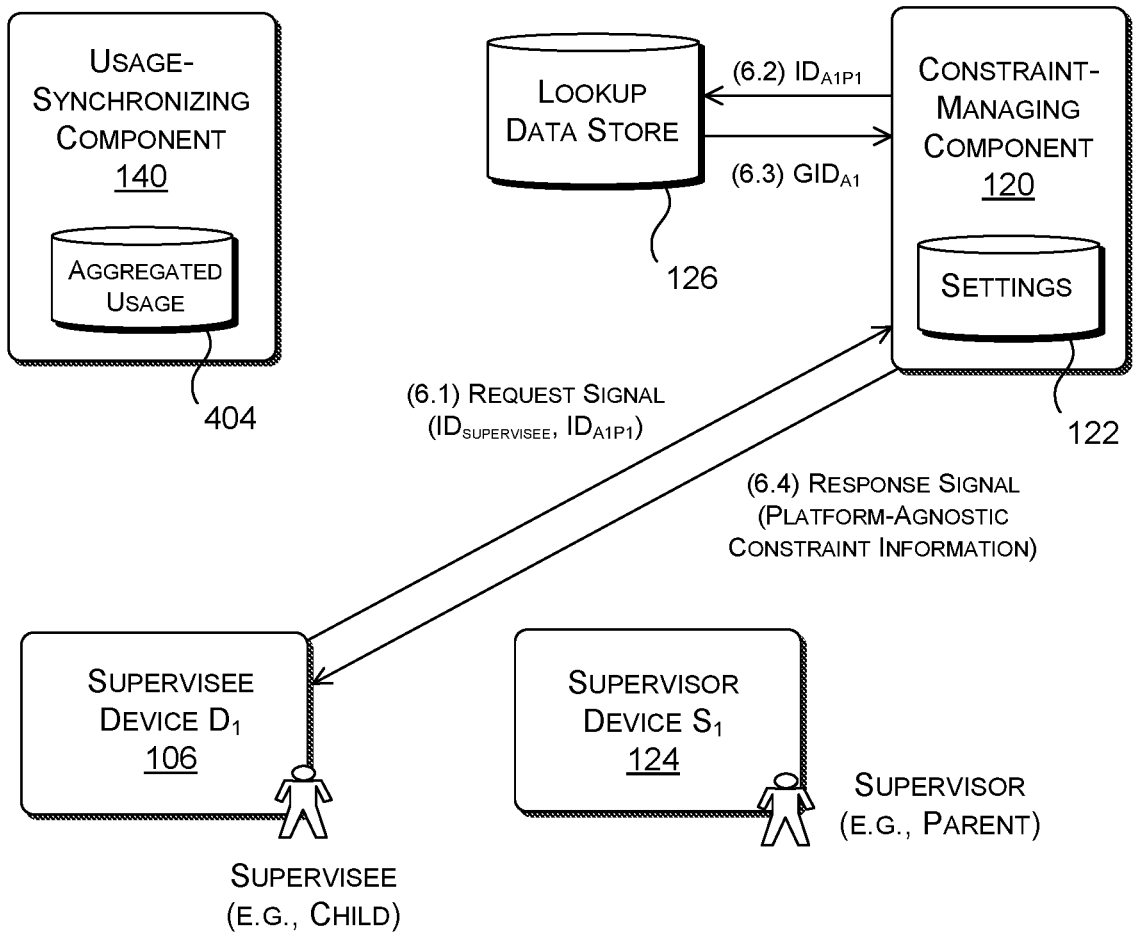
FIG. 6   ← SCENARIO A

FIG. 10

OVERVIEW OF AN APPLICATION CONTROL OPERATION (SERVER-SIDE PERSPECTIVE)
1402

IDENTIFY A PARTICULAR VERSION OF AN APPLICATION TO WHICH THE SUPERVISEE HAS ACCESS VIA THE SUPERVISEE COMPUTING DEVICE, THE PARTICULAR VERSION OF THE APPLICATION RUNNING ON A PARTICULAR APPLICATION EXECUTION PLATFORM, THE PARTICULAR VERSION BEING ASSOCIATED WITH AN IDENTIFIER THAT IDENTIFIES THE PARTICULAR VERSION OF THE APPLICATION.
1404

CONSULT A LOOKUP DATA STORE TO MAP THE IDENTIFIER ASSOCIATED WITH THE PARTICULAR VERSION OF THE APPLICATION TO PLATFORM-AGNOSTIC CONSTRAINT INFORMATION, THE PLATFORM-AGNOSTIC CONSTRAINT INFORMATION APPLYING TO INTERACTION BY THE SUPERVISEE WITH PLURAL VERSIONS OF THE APPLICATION ASSOCIATED WITH PLURAL RESPECTIVE APPLICATION EXECUTION PLATFORMS.
1406

CONTROL USE OF THE PARTICULAR VERSION OF THE APPLICATION BY THE SUPERVISEE BASED ON THE PLATFORM-AGNOSTIC CONSTRAINT INFORMATION.
1408

FIG. 14

OVERVIEW OF AN APPLICATION CONTROL OPERATION (CLIENT-SIDE PERSPECTIVE)
1502

RECEIVE PLATFORM-AGNOSTIC CONSTRAINT INFORMATION FROM A CONSTRAINT-MANAGING COMPONENT, THE PLATFORM-AGNOSTIC CONSTRAINT INFORMATION APPLYING TO INTERACTION BY A SUPERVISEE WITH PLURAL VERSIONS OF AN APPLICATION ASSOCIATED WITH PLURAL RESPECTIVE APPLICATION EXECUTION PLATFORMS,
THE SUPERVISEE INTERACTING WITH A PARTICULAR VERSION OF THE APPLICATION RUNNING ON A PARTICULAR APPLICATION EXECUTION PLATFORM.
1504

CONTROL USE OF THE PARTICULAR VERSION OF THE APPLICATION BASED ON THE CONSTRAINT RESPONSE SIGNAL.
1506

FIG. 15

Overview of Constraint Setting Operation
1602

Provide a user interface presentation to a supervisor, the user interface presentation including: a listing of applications that run on different application execution platforms; and a constraint-specification control that allows the supervisor to set platform-agnostic constraint information for each application in the listing, the platform-agnostic constraint information, once set for an application, constraining interaction by a supervisee with all versions of the application running on plural application execution platforms.
1604

Receive input from the supervisor that expresses new platform-agnostic constraint information, in response to interaction by the supervisor with the constraint-specification control.
1606

Send a setting signal to a constraint-managing component that specifies the new platform-agnostic constraint information, the constraint-managing component storing the new platform-agnostic constraint information in a data store.
1608

FIG. 16

MANAGING APPLICATION CONSTRAINTS ACROSS PLATFORMS

This application claims the benefit of U.S. Provisional Application No. 62/868,956 (the '956 application), filed on Jun. 30, 2019. The '956 application is incorporated by reference herein in its entirety.

BACKGROUND

Various tools have been proposed for assisting a supervisor (e.g., a parent) in monitoring and regulating the use of computing resources by a supervisee (e.g., the parent's child). Supervisees, however, can sometimes evade the restrictions imposed by these tools.

SUMMARY

A computer-implemented technique is described herein for defining and applying constraints that regulate a supervisee's use of applications. In one implementation, the technique provides a user interface presentation to a supervisor that lists a set of applications that run on different application execution platforms. For example, the different application execution platforms may include different respective supervisee computing devices. The user interface presentation also allows the supervisor to set platform-agnostic constraint information for any application. The platform-agnostic constraint information, once set for an application, constrains interaction by a supervisee with all versions of that same application. That is, the constraint information is said to be agnostic with respect to platform in the sense that it applies to a variety of application execution platforms that may run the application.

In one example, the platform-agnostic constraint information specifies a permitted amount of an activity that the supervisee is permitted to perform across all versions of an application. For instance, the constraint information may specify a total amount of time that the supervisee is permitted to spend per day in interacting with the application, across all versions of the application. In this scenario, the technique can send a signal to the supervisee's computing device that alerts the supervisee to the total amount of time that supervisee has spent interacting with all versions of the application in the course of the day. On the basis of this information, the supervisee's computing device can alert the supervisee to the amount of time that is remaining in which to interact with the application in the day. The technique also provides a dialogue mechanism that enables a supervisee to request additional time from the supervisor.

The technique is beneficial because it allows a supervisor to conveniently set up constraint information. For instance, the technique eliminates the need for the supervisor to independently specify constraints for individual versions of the same underlying application. The technique also reduces the possibility that the supervisee can evade the restrictions imposed by the supervisor. For instance, the technique will prevent the supervisee from circumventing a restriction by acquiring a new kind of device that uses a different version of the application, and then interacting with the application using that new device.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 shows an enforcement component, which is another element in the computing environment of FIG. 1.

FIG. 6 shows an example of how the computing environment of FIG. 1 can be used to identify and apply constraint information.

FIGS. 9 and 10 show a user interface presentation that allows a supervisor to set up constraint information, with respect to two respective states of the user interface presentation.

FIG. 14 shows a process that provides an overview of a technique for applying constraint information, from the standpoint of the constraint-managing component of FIG. 3.

FIG. 15 shows a process that provides an overview of a technique for applying constraint information, from the standpoint of a supervisee computing device.

FIG. 16 shows a process that provides an overview of a technique for setting up constraint information.

Figure 1:
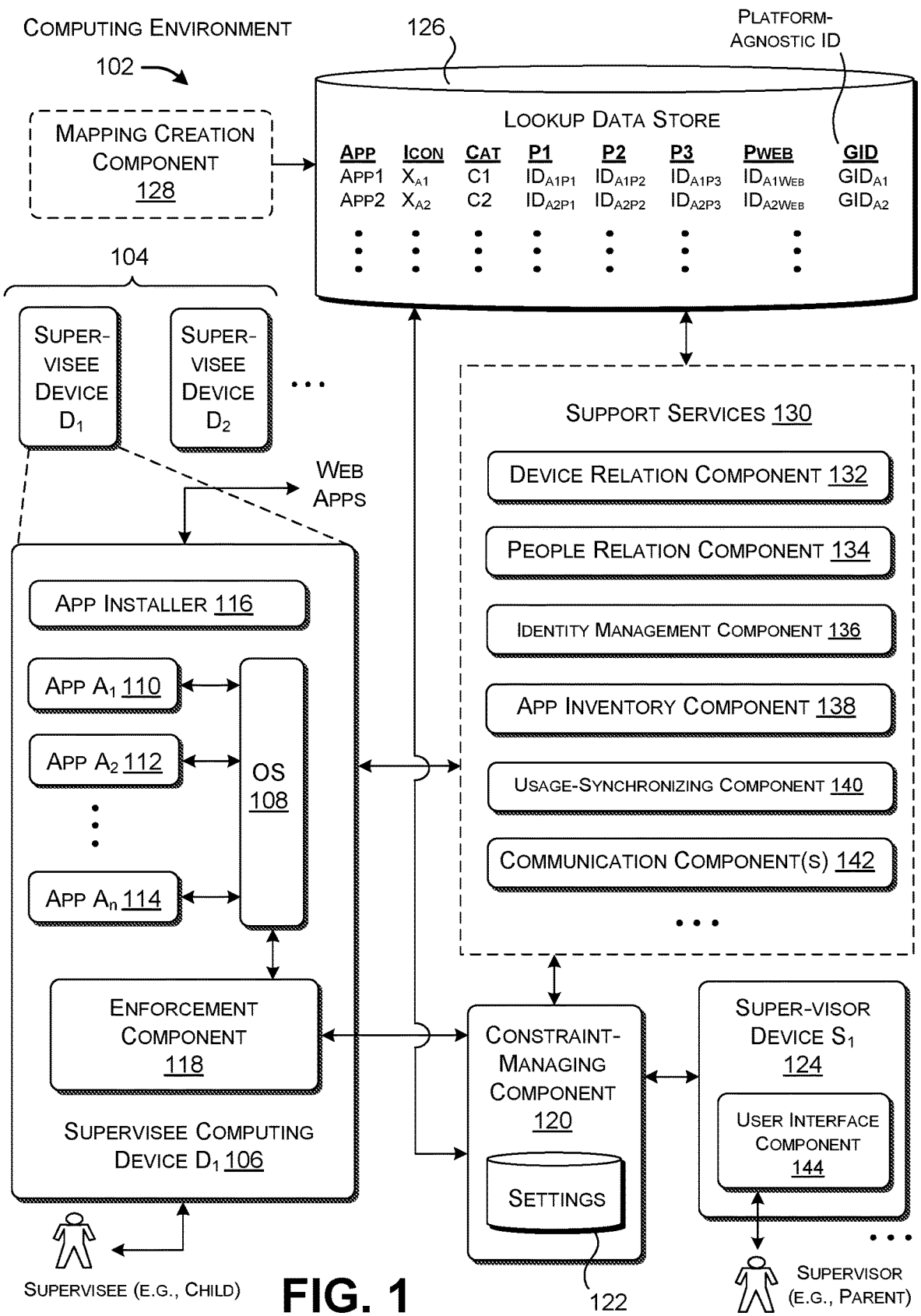
FIG. 1 shows an illustrative computing environment for setting up and applying constraint information.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for setting up and applying constraint information. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" encompasses one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In certain contexts, each of the terms "component," "tool," and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 for setting up and applying constraint information. The person or entity setting up the constraint information is referred to herein as a "supervisor." The person or entity that is affected by the constraint information is referred to as a "supervisee." In the most commonly evoked example herein, the supervisor is a parent and the supervisee corresponds to the parent's child. But the principles described herein apply to any person or entity who wishes to constrain the consumption of computer resources by another person or entity.

The constraint information broadly defines one or more limits that affect how the supervisee can interact with one or more applications. In some cases, a constraint governs what the supervisee is permitted to do with an application. For instance, a constraint may determine what application functions a supervisee may perform. Alternatively, or in addition, a constraint may determine what content items the supervisee may access using the application. Alternatively, or in addition, a constraint may restrict the individuals with whom the supervisee may interact using the application. To one extreme of this type of constraint, a constraint blocks the supervisee from accessing all of the functions provided by the application, thus effectively blocking the supervisee from the application as a whole. In other cases, a constraint prevents the supervisee from performing some application-related activities but not others. For example, a constraint may prevent the supervisee from accessing certain content items using the application but not others.

Alternatively, or in addition, a constraint governs the amount of an activity that a supervisee may perform while interacting with the application. For example, a constraint may specify a total amount of time that a supervisee may spend during the course of a day or other timespan in interacting with the application. Another constraint may specify a total amount of messages that a supervisee may send and/or receive in the course of a day or other timespan. Another constraint may specify a total amount of money that a supervisee may spend via an application, and so on.

Alternatively, or in addition, a constraint governs the timing at which a supervisee may perform an activity using an application. For example, a constraint may indicate that a supervisee is free to use a particular application function, but only on weekends, or within certain times of day, etc.

The above examples of constraints are described in the spirit of illustration, not limitation; other implementations can restrict the supervisee's interaction with an application in yet other ways. Further note that an "application" as used herein broadly refers to any computer program that performs any function or functions, and may encompass logic provided by an operating system.

The supervisee may interact with applications using plural computing devices 104, also referred to herein as "supervisee computing devices." The computing devices 104 can use any number of application execution platforms to execute the application. In this scenario, an application execution platform corresponds to the resources and techniques used by a local computing device to execute an application. For instance, an application execution platform may be defined, at least in part, by an operating system provided by a particular device manufacturer. In one example, for instance, the devices 104 can include a personal computer that runs the WINDOWS operating system provided by MICROSOFT CORPORATION of Redmond, Wash., an XBOX game console provided by MICROSOFT CORPORATION, a HOLOLENS mixed-reality device provided by MICROSOFT CORPORATION, a tablet-type computing device that runs the IOS operating system provided by APPLE INC. of Cupertino, Calif., a smartphone that runs the ANDROID operating system provided by GOOGLE INC. of Mountain View, Calif., and so on, each of which corresponds to a different application execution platform.

In other cases, a supervisee computing device may access a network-accessible system to interact with a network-accessible application (e.g., colloquially referred to as a web application). In that case, the term "application execution platform" corresponds to a particular network-accessible application in conjunction a browser component (e.g., a browser program) that a supervisee computing device uses to access the network-accessible application. Hence, different network-accessible applications correspond to different respective application execution platforms. Here, a supervisee does not download an application to a local supervisee computing device; rather the supervisee (or someone acting on behalf of the supervisee) registers with a network-accessible system to gain access to its application(s). Or the supervisee more simply accesses the network-accessible system without formally subscribing to its services. However, to facilitate explanation, many of the examples to follow will describe the case in which all or some of the applications are installed on a supervisee's local computing devices.

The computing devices 104 may run different versions of each particular application. For instance, a WINDOWS-based PC can run a first version of a social media application, while an ANDROID-based smartphone can run a second version of the social media application. These applications perform the same basic functions, but may use different computer code to do so (at least in part). Further, different versions of the applications may vary somewhat in their user experiences. For example, different versions of the applications can use different respective sets of user interface presentations that differ in at least their look and feel. Finally, in many cases, different versions of applications may be associated with different identifiers. An identifier of an application refers to the name given by a developer or other entity to an application, and may be specified in the metadata associated with the application, or elsewhere.

Previous parental guidance tools treat applications that run on different application execution platforms as distinct applications. As a result, a constraint that a supervisor applies to a first version of an application does not necessarily apply to a second version of an application. To address this issue, the supervisor needs to define individual constraint information for each version of the application. For example, the supervisor needs to define a first constraint that restricts his or her child's use of a game when played on a game console, and a second constraint that restricts his or her child's use of the same game when played on a personal computing device.

The computing environment 102 described herein overcomes the above-noted inefficiency by defining platform-agnostic constraint information that applies to all versions of the same application functionality. That is, the platform-agnostic constraint information is said to be agnostic with respect to platform because it applies regardless of the platform used to execute the application. The explanation below provides an overview of this solution with respect to FIG. 1. Later figures and accompanying textual explanation provide additional information regarding individual components shown in FIG. 1.

To begin with, FIG. 1 depicts the components provided by one representative user computing device 106 (also referred to below as a "supervisee computing device"). The components include an operating system (OS) 108 and one or more applications (110, 112, . . . , 114) that execute using the resources of the OS 108. The supervisee computing device 106 may include an application installer 116 for downloading applications from any source(s) of the applications. But note that, in other cases, the supervisee computing device already provides one or more applications as native resources. Further note that the supervisee computing device 106 can interact with network-accessible applications provided by one or more network-accessible systems via a browser program (e.g., the EDGE browser program provided by MICROSOFT CORPORATION). The supervisee computing device 106 may also include an enforcement component 118 that controls the supervisee's interaction with the applications, as governed by constraint information associated with each application. Although not shown, other supervisee computing devices may include the same components as the representative supervisee computing device 106.

A constraint-managing component 120 allows a supervisor to view, create, modify, and delete constraint information via one or more user interface presentations (described below with reference to FIGS. 9 and 10). The constraint-managing component 120 stores each instance of constraint information in a data store 122. It thereafter makes this constraint information available to the enforcement component of each supervisee computing device. The supervisor can use one or more computing devices (such as representative computing device 124) to interact with the constraint-managing component 120. For instance, the computing device 124 can correspond to a desktop personal computing device, a smartphone, etc. The computing device 124 is also referred to below as a "supervisor computing device."

A lookup data store 126 provides a resource for associating different versions of an application with platform-agnostic constraint information. That is, in one implementation, each entry of the lookup data store 126 specifies a group of version-specific identifiers associated with respective versions of the application that run on different application execution platforms. For instance, for an illustrative application A1, the group includes a first identifier $ID_{A1P1}$ associated with a version of an application that runs on a first application execution platform (P1), a second identifier $ID_{A1P2}$ associated with a version of an application that runs on a second application execution platform (P2), and so on. An identifier $ID_{A1WEB}$ is associated with a network-accessible version of the application that runs on a browser component. That is, an application execution platform can refer to the resources associated with a local supervisee computing device that runs a locally-installed application and/or a network-accessible application in conjunction with a browser component. The entry also includes a platform-agnostic identifier ($GID_{A1}$) that represents the application A1 independent of platform. The constraint-managing component 120 uses the same platform-agnostic identifier ($GID_{A1}$) to identify constraint information associated with the application A1. Hence, the lookup data store 126 can be said to ultimately map a platform-specific identifier (e.g., $ID_{A1P1}$) to platform-agnostic constraint information associated with the application A1.

In one manner of operation, assume that the supervisee is interacting with a particular version of an application A1 that runs on the supervisee computing device 106, associated with the platform-specific application identifier ($ID_{A1P1}$). The constraint-managing component 120 can use the lookup data store 126 to map the specific identifier ($ID_{A1P1}$) to the platform-agnostic identifier $GID_{A1}$. The constraint-managing component 120 can then use the platform-agnostic identifier $GID_{A1}$ and a user identifier ($ID_{supervisee}$) to access the constraint information that applies to the supervisee's interaction with the application A1. The constraint-managing component 120 can then provide that platform-agnostic constraint information to the enforcement component 118 of the supervisee computing device 106. The enforcement component 118 can thereafter use the platform-agnostic constraint information to control the supervisee's interaction with the application A1.

Different environment-specific implementations can perform the above-described operations in response to different triggering events. For example, the constraint-managing component 120 can send platform-agnostic constraint information to the supervisee computing device 106 in response to any of: the supervisee first downloading the application A1; the supervisee starting up the application A1; the supervisor updating the constraint information; the supervisee computing device 106 explicitly requesting the constraint information for any reason, and so on. For example, in one implementation, the supervisee computing device 106 can obtain the platform-agnostic constraint information when the application A1 is first installed on the supervisee computing device 106 and when the constraint is subsequently modified by the supervisor. This implementation allows the supervisee computing device 106 to perform its application-constraining functions in offline fashion. In another implementation, the supervisee computing device 106 requests the platform-agnostic constraint information each time the supervisee seeks to perform a particular action using the application A1. Still other implementations are possible. FIGS. 6-9, described below, provide additional information regarding illustrative protocols for setting up and applying constraint information.

The lookup data store 126 can include additional data regarding each application. For instance, the lookup data store 126 can store an icon identifier that identifies an icon or other kind of identifier to be presented by a user interface presentation to denote the application. The lookup data score 126 can also store a category identifier that identifies a category associated with the application. As will be described in greater detail below, the constraint-managing component 120 can also allow a supervisor to set up constraints that apply to an entire category of applications.

A mapping creation component 128 generates the information provided in the lookup data store 126. In one implementation, the mapping creation component 128 relies on one or more users to manually determine whether two or more applications correspond to different versions of the same underlying application, and thus constitute an application cluster. A user may offer his or her judgments based on plural pieces of evidence, such as source material provided by application developers. More specifically, the mapping creation component 128 can rely on different people to identify clusters of related applications, including any combination of: an application developer; a supervisor; a supervisee; plural experts who provide their judgments via a crowdsourcing platform, etc. Alternatively, or in addition, the mapping creation component 128 can rely on automated or semi-automated tools for determining whether two or more applications correspond to different versions of the same underlying application.

The computing environment 102 may also interact with plural support services 130 to perform its functions. These services 130 include, but are not limited to: a device relation component 132, a people relation component 134, an identity management component 136, an application ("app") inventory component 138, a usage-synchronizing component 140, one or more communication components 142, and so on. FIG. 1 shows that each support service is independent of the supervisee computing devices 104. Alternatively, or in addition, each supervisee computing device can implement any aspect of the support services 104, in whole or in part.

The identity management component 136 provides information regarding each user of the computing environment 102. For example, the identity management component 136 asks each user to establish a unique account number when he or she first registers with the computing environment 102. The identity management component 136 also optionally stores a profile associated with each user.

The device relation component 132 stores information regarding the association between users and their devices in the computing environment 102. The device relation component 132 can establish this *nexus* by asking the user to specify his or her account number when registering each new device. The device relation component 132 can thereafter identify all of a user's devices by finding all of those devices that have been tagged with the user's unique account number. The device relation component 132 can also optionally record information regarding the association between users and the network-accessible services to which they have subscribed, or which they otherwise have access.

The people relation component 134 stores information regarding the association between the supervisor and the supervisee. The people relation component 134 can establish this *nexus* based on setup information provided by the supervisor. For example, upon registering for the service provided by the computing environment 102, a parent can identify his or her child, and the account number associated with the child. Alternatively, or in addition, the people relation component 134 can rely on a preexisting social graph to define the relationship among people. In whatever manner compiled, the constraint-managing component 120 can use this relationship information to verify whether the supervisor is duly authorized to define constraints that apply to the supervisee.

In one implementation, the app inventory component 138 stores information regarding each application that a supervisee has installed on his or her computing devices 104 (and each application that is natively installed on the supervisee computing devices 104). The app inventory component 138 can determine this information by receiving a signal from a supervisee computing device and/or an external download service each time that the supervisee computing device downloads an application. Alternatively, or in addition, the app inventory component 138 can directly poll each supervisee computing device to determine the applications that the supervisee computing device includes in its local storage. In one implementation, the app inventory component 138 stores information regarding the applications by providing the platform-specific identifiers associated with the applications (e.g., $ID_{A1P1}$, $ID_{A2P1}$, etc.). The constraint-managing component 120 can later rely on the lookup data sore 126 to identify those applications that refer to different versions of the same underlying base application (e.g., A1, A2, etc.).

In other implementations, the app inventory component 138 more generally stores information regarding each application that is accessible to the supervisee, including locally-installed applications and network-accessible applications. The app inventory component 138 can determine that a supervisee has registered for a network-accessible application based on information provided by the supervisee's computing device and/or the network-accessible system that provides the network-accessible application.

The usage-synchronizing component 140 records information regarding the supervisee's use of each application. For example, the usage-synchronizing component 140 can maintain a counter per application that reflects the total amount of time that a supervisee has spent interacting with plural versions of the same application within a prescribed timeframe (such as a single day, etc.). The usage-synchronizing component 140 can maintain other counters for other usage metrics, e.g., by maintaining a counter per application that records the total number of messages sent or received by the recipient within a prescribed timeframe.

The communication components 142 provide mechanisms by which the supervisee and the supervisor can interact with each other. For instance, the communication components 142 can include an Email component, a text-messaging component, a voice chat component, a video chat component, and so on. In one scenario, the communication components 142 can allow the supervisee to request additional time from the supervisor. The communication components 142 also allows the supervisor to reply to the supervisee.

The supervisor computing device 124 includes a user interface component 144. The user interface component 144 provides one or more user interface presentations (described below) that allow the supervisor to view and edit the contents of the data store 122. For instance, the supervisor can interact with these user interface presentation(s) to create new platform-agnostic constraint information and modify existing platform-agnostic constraint information.

Figure 2:
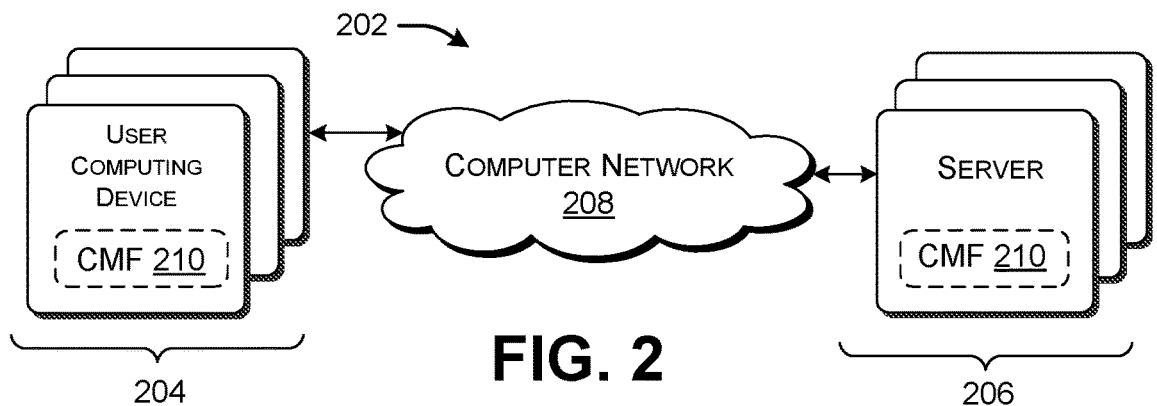
FIG. 2 shows computing equipment that can be used to implement the computing environment of FIG. 1.

FIG. 2 shows computing equipment 202 that can be used to implement the computing environment 102 of FIG. 1. The computing equipment 202 includes plural computing devices 204 communicatively coupled to one or more servers 206 via a computer network 208. The computing devices 204 can include any assortment of user computing devices, including, but not limited to: personal desktop computing devices; laptop computing devices; any kinds of handheld computing devices (including tablet-type computing devices, smartphones, electronic media reader devices, etc.); mixed-reality devices; Internet-of-Thing (IoT) devices; wearable computing devices, and so on. The computer network 208 can correspond to a wide area network (e.g., the Internet), a local area network, point-to-point links, etc., or any combination thereof.

The computing environment 102 of FIG. 1 can distribute its constraint management functionality among the components shown in FIG. 2 in any manner. For example, in one merely illustrative implementation, the server(s) 206 implement the constraint-managing component 120, the lookup data store 126, any of the support services 130, and any network-accessible applications. Each individual supervisee computing device implements locally-installed applications, an instantiation of the enforcement component, etc.

In another implementation, any function shown in FIG. 1 as external to the local computing devices 204 can alternatively, or in addition, be implemented by the local computing devices 204 themselves. For example, the supervisee computing devices 104 can replicate the information provided in the lookup data store 126 in distributed fashion, eliminating the need for an external lookup data store 126. In another implementation, the functionality of the constraint-managing component 120 can be performed in whole or in part by each supervisor computing device in local fashion.

Alternatively, or in addition, any function shown in FIG. 1 as internal to a local computing device can alternatively, or in addition, be implemented by an external server. For example, a server can implement aspects of the enforcement functions attributed to each device's enforcement component.

FIG. 2 illustrates the flexibility with which the constraint management functionality of the computing environment 102 can be distributed among the user computing devices 204 and the servers 206 by generically indicating that each user computing device includes constraint management functionality (CMF) 210 and each server includes constraint management functionality (CMF) 212.

Figure 3:
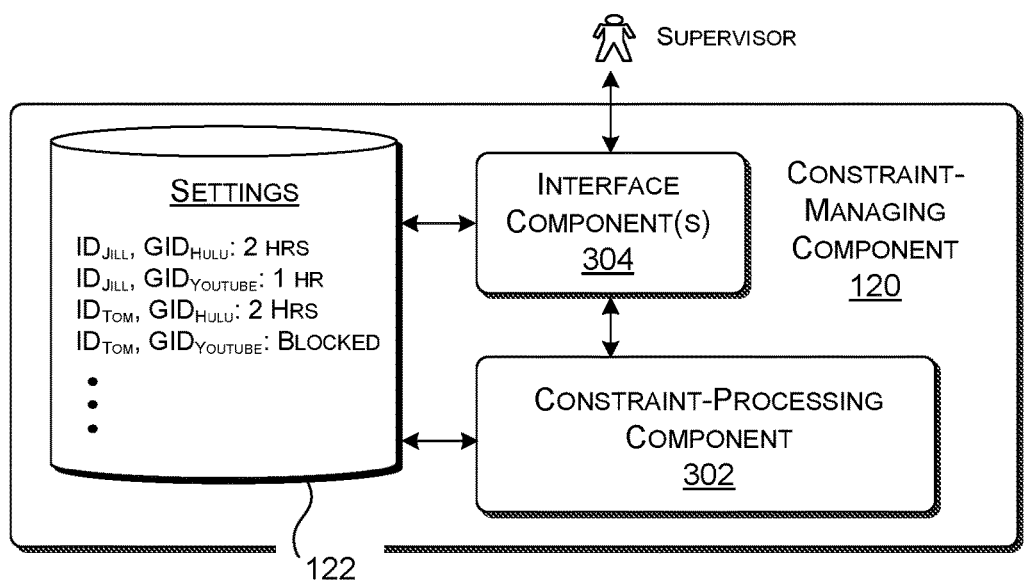
FIG. 3 shows a constraint-managing component, which is one element in the computing environment of FIG. 1.

FIG. 3 shows one implementation constraint-managing component 120. The constraint-managing component 120 includes a constraint-processing component 302 that maintains information in the data store 122. For example, the constraint-processing component 302 can create, edit, and delete constraint information in the data store 122 in response to instructions from the supervisor. In one implementation, each entry in the data store 122 identifies a user (by specifying a user identifier), an application (by specifying its platform-agnostic identifier), and constraint information. For instance, the constraint information may indicate that the supervisee is allocated a prescribed amount of time per day to interact with the application, regardless of the device that the supervisee uses to interact with the application.

One or more interface components 304 enable the constraint-managing component 120 to interact with the user interface component 144 of the supervisor computing device 124 and other elements of the computing environment 102. The interface component(s) 304 can use one or more Application Programming Interfaces (APIs) or other interface mechanisms to implement this interaction.

Figure 4:
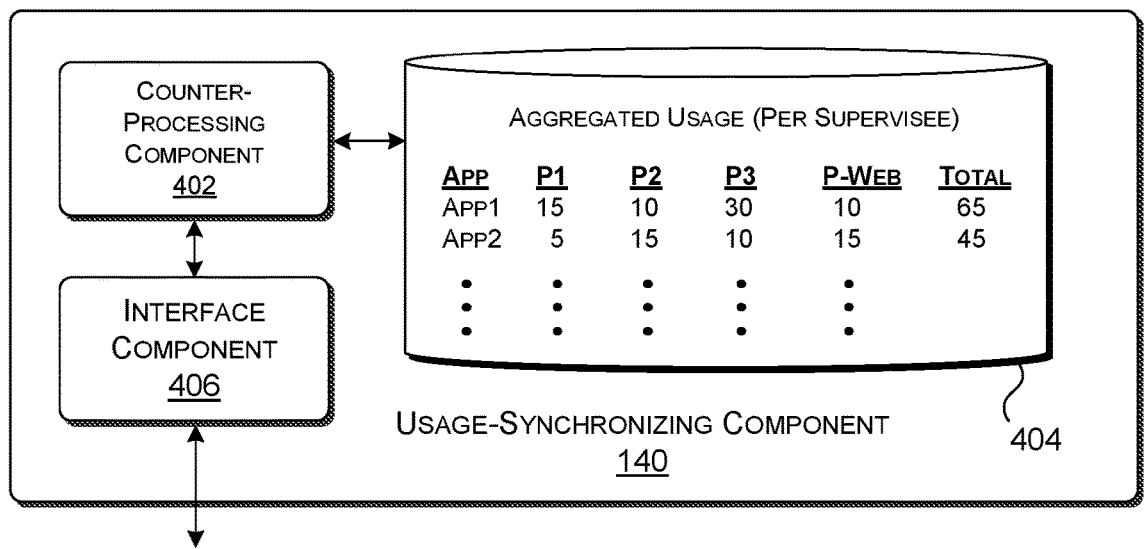
FIG. 4 shows a usage-synchronizing component, which is another element in the computing environment of FIG. 1.

FIG. 4 shows one implementation of the usage-synchronizing component 140. The usage-synchronizing component 140 includes a counter-processing component 402 for maintaining a plurality of counters in a data store 404. Each counter identifies an amount of activity that a user has performed in the course of interacting with an application. More specifically, in one merely illustrative case, the counter-processing component 402 can maintain a plurality of counters for each application with which a supervisee interacts. A first counter identifies the amount of time that the supervisee has spent using an application (A1) using a first supervisee application execution platform (P1) within a prescribed timeframe (e.g., a day), a second counter identifies the amount of time that the supervisee has spent using the application using a second supervisee application execution platform (P2) within the prescribed timeframe, and so on. An application execution platform in this context can correspond to a particular device on which an application is locally installed, a network-accessible application that runs on a browser component, and so on. In addition, the counter-processing component 402 maintains a global counter for this application that represents the sum of the values in the per-platform counters. That is, in one scenario, the global counter represents the total amount of time that the user has spent interacting with the application within the specified timeframe, across all application execution platforms. In another implementation, the counter-processing component 402 only maintains the global counter, that is, by eliminating the per-platform counters.

An interface component 406 enables the usage-synchronizing component 140 to interact with the enforcement component of each supervisee computing device and/or other elements of the computing environment 102. The interface component 406 can use one or more APIs or other interface mechanisms to implement this interaction.

FIG. 5 shows one implementation of the enforcement component 118 provided by the representative supervisee computing device 106. The enforcement component 118 includes an application (app) controller 502 that governs the execution of an application based on constraint information (or instructions) provided by the constraint-managing component 120. The app controller 502 can perform this task in different ways. In one approach, the app controller 502 interacts with the operating system (OS) 108 to enable or disable an application as a whole, or to enable or disable specific functions performed by the application. If disabled, the OS 108 blocks or otherwise disables a launch request sent by the application. Alternatively, or in addition, the app controller 502 can leverage APIs provided by an application to directly control the application in various ways (as governed by the APIs designed by each individual application developer). For the case of a network-accessible application, the app controller 502 can block access to a network-accessible service associated with a specified network address.

The app controller 502 also performs a role in monitoring activity limits imposed by the constraint information. For example, consider the case in which the constraint information specifies that a supervisee is given one hour per day to interact with a particular application A1. The app controller 502 can send an incremental usage signal to the usage-synchronizing component 140 each time the user interacts with the application A1 for a prescribed increment of time (such as, without limitation, five minutes). The usage-synchronizing component 140 responds to this request by identifying the total amount of time that the supervisee has spent interacting with all versions of the application A1 up to the current time, across all application execution-platforms. It reports this information to the app controller 502 in a usage signal. The app controller 502 then generates a measure of the remaining amount of time that the supervisee can interact with the application A1, e.g., by subtracting the total amount of time from the allocated amount of time specified by the constraint information.

A user interface component 504 generates one or more user interface presentations (described below) and delivers those presentations to the supervisee. For example, those user interface presentations can alert the supervisee to the amount of time remaining in which he or she is permitted to interact with an application. In addition, the user interface presentations can give the supervisee the opportunity to interact with the supervisor, e.g., by requesting additional time to interact with the application. One or more other interface components 506 provide a mechanism by which the enforcement component 118 can interact with any elements of the computing environment 102, such as the usage-synchronizing component 140. The other interface component(s) 506 can use any technology to perform this interaction, such as one or more APIs or other interface mechanisms.

FIG. 6 shows an example of how the computing environment 102 of FIG. 1 can be used to identify and apply constraint information. In a first operation (6.1), the supervisee computing device 106 sends a request signal that requests constraint information from the constraint-managing component 120. The signal specifies a particular version of an application A1 that is running on the supervisee computing device 106. More specifically, assume that the supervisee computing device 106 uses a particular application execution platform (P1), such as a particular operating system. The request signal will therefore specify an identifier ($ID_{A1P1}$) associated with this version of the application A1. The request signal can also include an identifier ($ID_{supervisee}$) that identifies the supervisee.

Upon receipt of the request signal, the constraint-managing component 120 queries the lookup data store 126 to find the platform-agnostic identifier ($GID_{A1}$) that is associated with the platform-specific identifier ($ID_{A1P1}$). FIG. 6 represents these actions as operations (6.2) and (6.3). The constraint-managing component 120 can then use the user identifier ($ID_{supervisee}$) and platform-agnostic identifier ($GID_{A1}$) to find matching platform-agnostic constraint information in the data store 122.

In operation (6.4), the constraint-managing component 120 provides a response signal to the supervisee computing device 106. In one implementation, the response signal specifies the platform-agnostic constraint information. The local enforcement component 118 of the supervisee computing device 106 then controls the application A1 in accordance with the constraint information, e.g., by enabling or disabling a requested function. In another implementation, the constraint-managing component 120 only sends the response signal if the supervisee is prohibited from performing a requested action. By default, the supervisee will be allowed to perform the requested action unless a response signal is received that prohibits that action.

As noted above, different implementations can execute the operations shown in FIG. 6 in response to different respective triggering events. In one case, the supervisee computing device 106 queries constraint-managing component 120 when it starts up and when it receives notice that constraint information has changed. In another implementation, the supervisee computing device 106 can query the constraint-managing component 120 each time the supervisee seeks to perform an operation using the application A1. Still other invocation strategies are possible. For example, in other implementations, the constraint-managing component 120 can proactively send platform-agnostic constraint information to the supervisee computing device 106 when the constraint information changes, without being prompted by the supervisee computing device 106.

Figure 7:
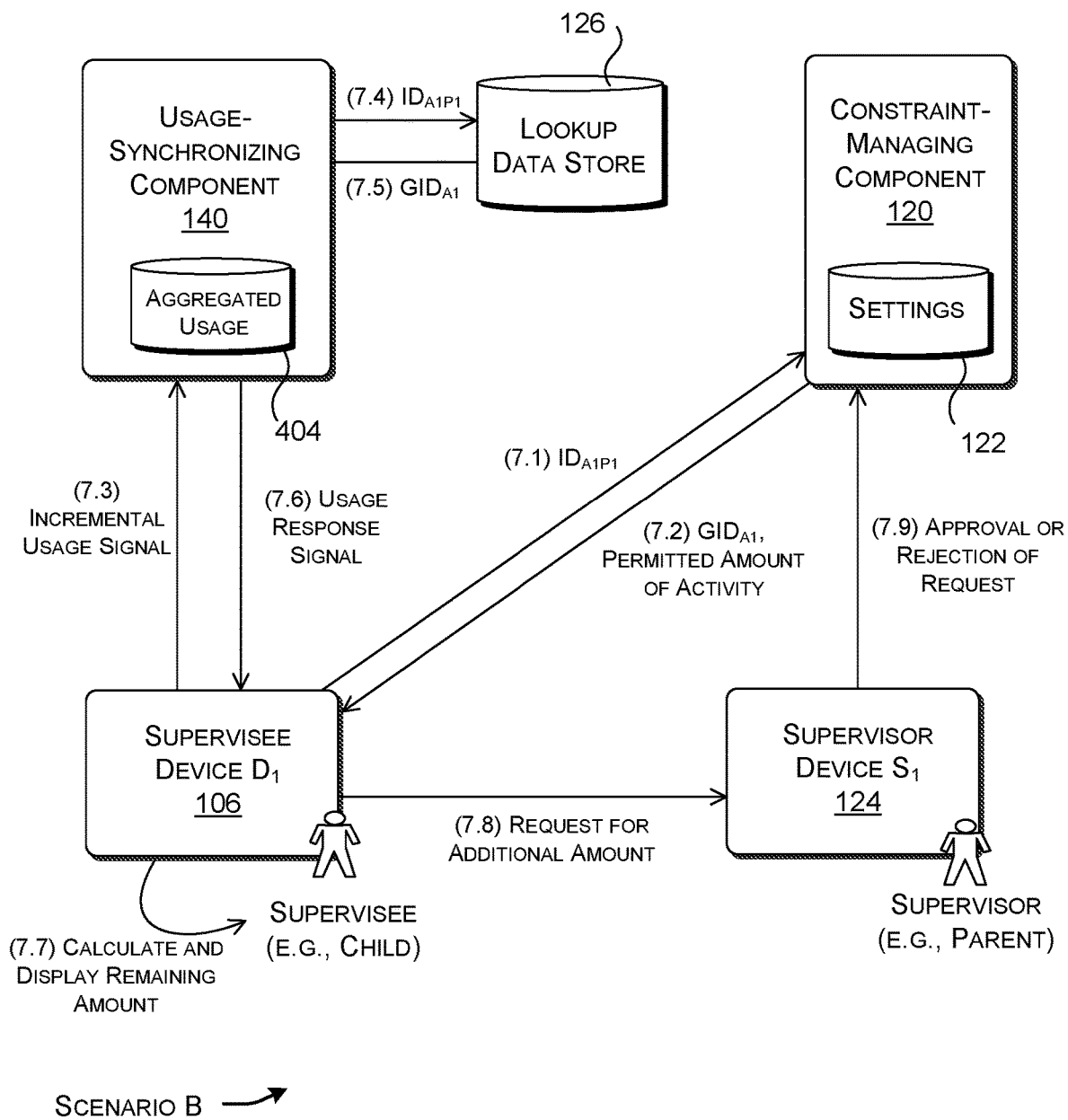
FIG. 7 shows another example of how the computing environment of FIG. 1 can be used to identity and apply constraint information.

FIG. 7 shows another example of how the computing environment 102 of FIG. 1 can be used to identify and apply constraint information. In operations 7.1 and 7.2, the supervisee computing device 106 receives platform-agnostic constraint information from the constraint managing-component 120 in the same manner described above, in response to any environment-specific triggering event. Assume in this case that the platform-agnostic constraint information identifies a permitted amount of time ($t_{limitA1}$) that the supervisee is permitted to spend interacting with an application A1 within a specified span of time (e.g., a single day), across all versions of the application. More generally, the constraint information specifies a permitted amount of activity that the supervisee is permitted to perform using the application A1.

In operation (7.3), the supervisee computing device 106 sends an incremental usage signal to the usage-synchronizing component 140. For example, at the end of every five-minute interval, the supervisee computing device 106 can send an incremental usage signal to the usage-synchronizing component 140, indicating that the supervisee has interacted with the application A1 for a new increment ($t_{\Delta A1}$) of five minutes. In another scenario, the supervisee computing device 106 can send an activity signal to the usage-synchronizing component 140 that indicates that the supervisee has sent (or received) n messages within the last 15 minutes, and so on. But assume that the first-mentioned scenario applies for the remainder of the explanation of FIG. 7 (in which the activity signal reports an interval of time $t_{\Delta A1}$ that the supervisee has spent interacting with the application A1). The incremental usage signal also includes an identifier ($ID_{supervisee}$) that identifies the supervisee and an identifier ($ID_{A1P1}$) that identifies the particular version of the application with which the supervisee is interacting.

In operations (7.4) and (7.5), the usage-synchronizing component 140 uses the lookup data store 126 to map the platform-specific identifier ($ID_{A1P1}$) into the counterpart platform-agnostic identifier ($GID_{A1}$). On the basis of this information, the usage-synchronizing component 140 updates a platform-agnostic counter for the application A1 by adding the incremental amount of time ($t_{\Delta A1}$) to the previous value of the counter; this generates an updated total of amount of time ($t_{totalA1}$) that the supervisee has spent interacting with the application A1, across different versions of the same application.

In operation (7.6), the usage-synchronizing component 140 sends a usage response signal to the supervisee computing device 106. The usage response signal specifies the total amount of time ($t_{totalA1}$) that the supervisee has spent interacting with the application A1. In operation (7.7), the enforcement component 118 can subtract the time ($t_{totalA1}$) from an amount of allocated time ($t_{limitA1}$) specified by the constraint information. This yields the amount of time ($t_{remainA1}$) that is remaining for the supervisee to interact with the application A1, within a given timeframe. The enforcement component 118 can then present a user interface presentation that alerts the supervisee to the remaining amount of time. For that special case in which the supervisee has no remaining amount of time, the enforcement component 118 can disable the application A1, and notify the supervisee of this event.

Assume that the enforcement component 118 provides (or otherwise exposes) a dialogue mechanism by which the supervisee and the supervisor may converse using any communication component (Email, text messaging, SMS, voice chat, video chat, etc.). In operation (7.8), the supervisee uses the dialogue mechanism to send a request signal to the supervisor computing device 124, asking the supervisor for more time to interact with the application. In operation (7.9), the supervisor computing device 124 sends a signal to the constraint-managing component 118; that signal conveys either an approval or rejection of the supervisee's request. If approved, the constraint-managing component 118 can update the appropriate constraint information in the data store 122, e.g., by adding extra time to the allocated time specified in the constraint information for the supervisee and the application under consideration. In a final operation (not shown), the constraint-managing component 120 can send a signal to the supervisee computing device 106 that notifies the supervisee (and the enforcement component 118) of the fact that he or she has been given more time to interact with the application A1.

Although not shown, the supervisee computing device 106 can also send a usage inquiry signal to the usage-synchronizing component 140 when the supervisee first activates the application A1. This operation will trigger the same operations described above to inform the supervisee of the total amount of time that is remaining in which he or she may interact with the application A1, across all versions of the application.

Figure 8:
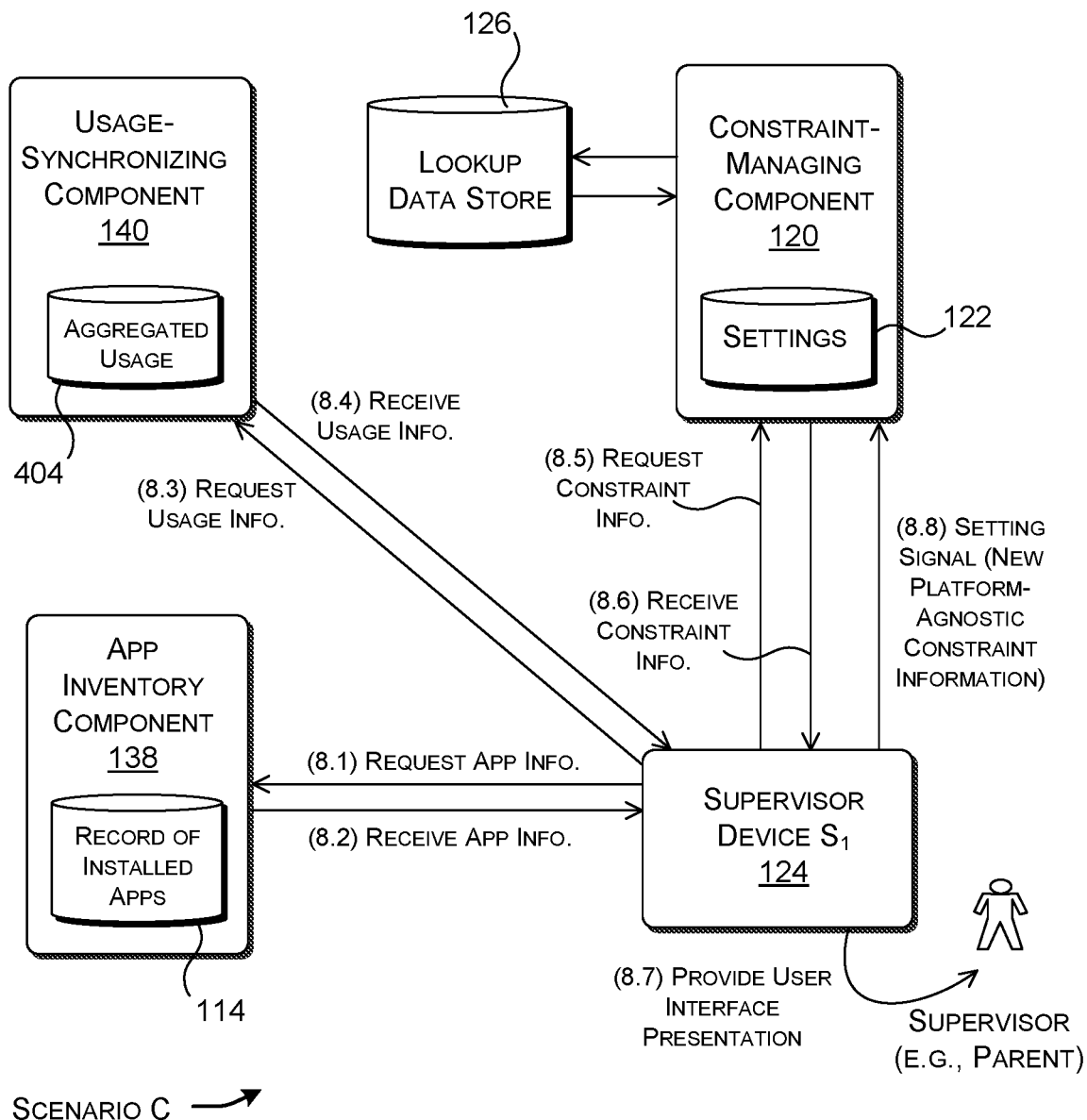
FIG. 8 shows an example of how the computing environment of FIG. 1 can be used to establish constraint information.

FIG. 8 shows an example of how the computing environment 102 of FIG. 1 can allow the supervisor to view and modify constraint information maintained in the constraint-managing component 120. The computing environment 102 invokes the process of FIG. 8 when the supervisor makes a request to view the constraint information. In operations 8.1 through 8.6, the supervisor computing device 124 collects the various pieces of data that it needs to compile a user interface presentation. For instance, in operations 8.1 and 8.2, the supervisor computing device 124 receives an indication of the applications that the supervisee has installed on the supervisee computing devices 104 and/or the applications that are natively installed on the supervisee computing devices 104 and/or the applications that the supervisee has otherwise gained access to (including network-accessible applications); it obtains this information from the app inventory component 138. In operations 8.3 and 8.4, the supervisor computing device 124 receives information regarding the total amount of activity that a supervisee has performed in interacting with the applications on any of the application execution platforms; it obtains this information from the usage-synchronizing component 140. In operations 8.5 and 8.6, the supervisor computing device 124 receives information regarding the platform-agnostic constraint information that currently apply to the applications.

In operation 8.7, the user interface component 144 of the supervisor computing device 124 generates a user interface presentation based on the above-collected information. As will be described below in connection with FIGS. 9 and 10, the user interface presentation lists all of the applications installed by the supervisee computing devices 104 or otherwise accessible to the supervisee computing devices. More specifically, the user interface presentation provides a single entry for each application, not a single entry for each version of the same application (or not only a single entry). For instance, assume that the app inventory component 138 identifies two versions of the same application installed on the supervisee computing devices 104, e.g., by giving their platform-specific identifiers ($ID_{A1P1}$, $ID_{A1P2}$). The supervisor computing device 124 can discover that these two applications correspond to different versions of the same application A1 associated with identifier $GID_{A1}$ by consulting the lookup data store 126. In operation (8.8), assume that the supervisor interacts with the user interface presentation to update constraint information associated with at least one application. The constraint-managing component 120 can store the new constraint information in the data store 126 and optionally notify the supervisee computing device 106.

Note that the signal protocols described in FIGS. 6-8 are presented in the spirit of illustration, not limitation. Other implementations can vary these protocols in various ways. For example, in FIG. 6, the constraint-managing component 120 sends raw constraint information to the enforcement component 118, which the enforcement component 118 subsequently uses to control the supervisee's interaction with an application. In another implementation, however, the constraint-managing component 120 can perform any type of preliminary processing on the constraint information to generate control instructions; it can then send the control instructions to the enforcement component 118 in lieu of the raw constraint information, or in addition to the raw constraint information.

As another variation, in FIG. 7, the enforcement component 118 performs the task of calculating the remaining amount of time. But in another implementation, this task can be allocated to the usage-synchronizing component 140 or any other component(s) of the computing environment 102.

In another variation, in FIG. 8, the supervisor computing device 124 performs the primary role in constructing a user interface presentation. In another implementation, the constraint-managing system 120 and/or other components of the computing environment 102 can play a role in generating the user interface presentation.

Figure 9:
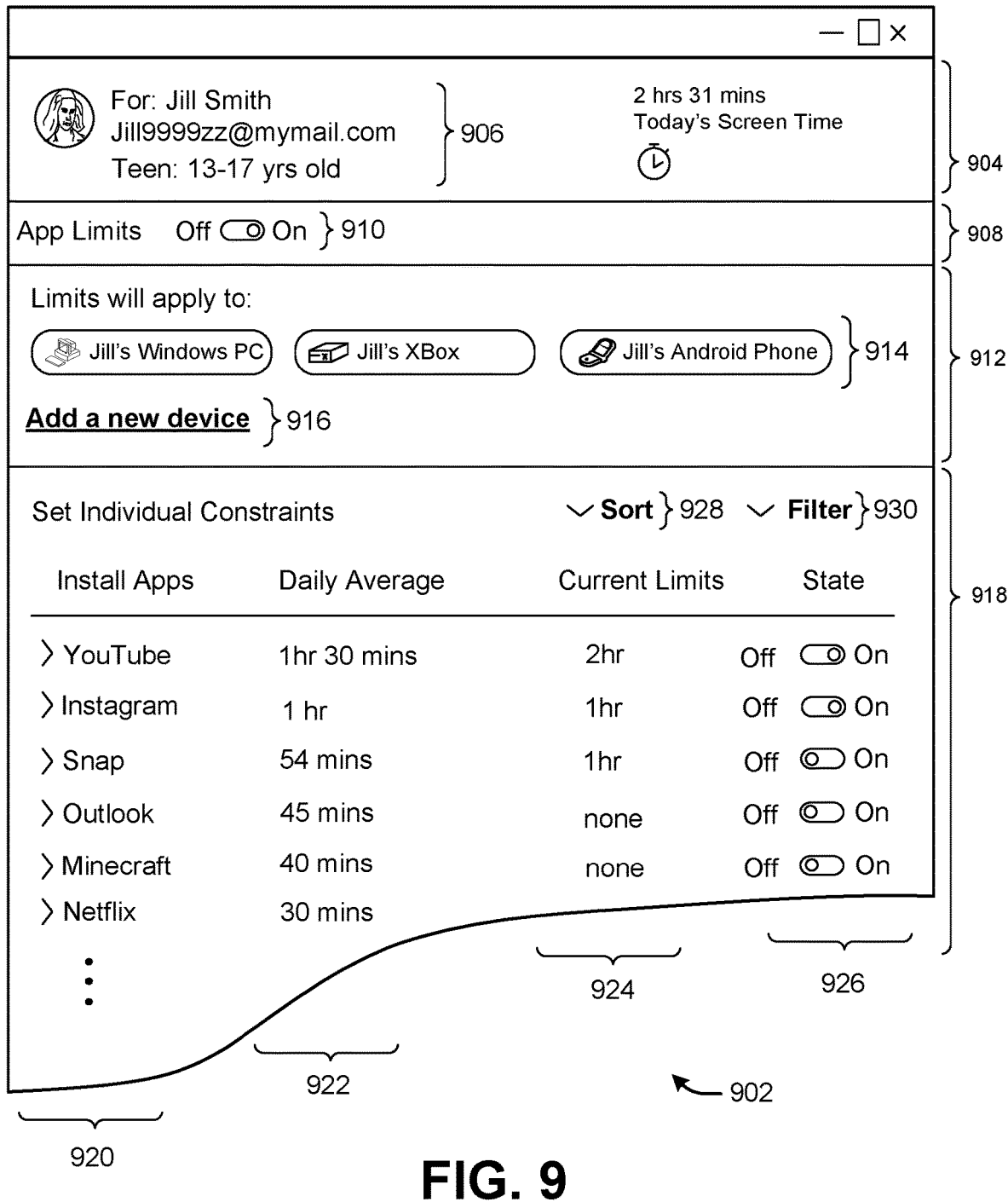
Figure 10:
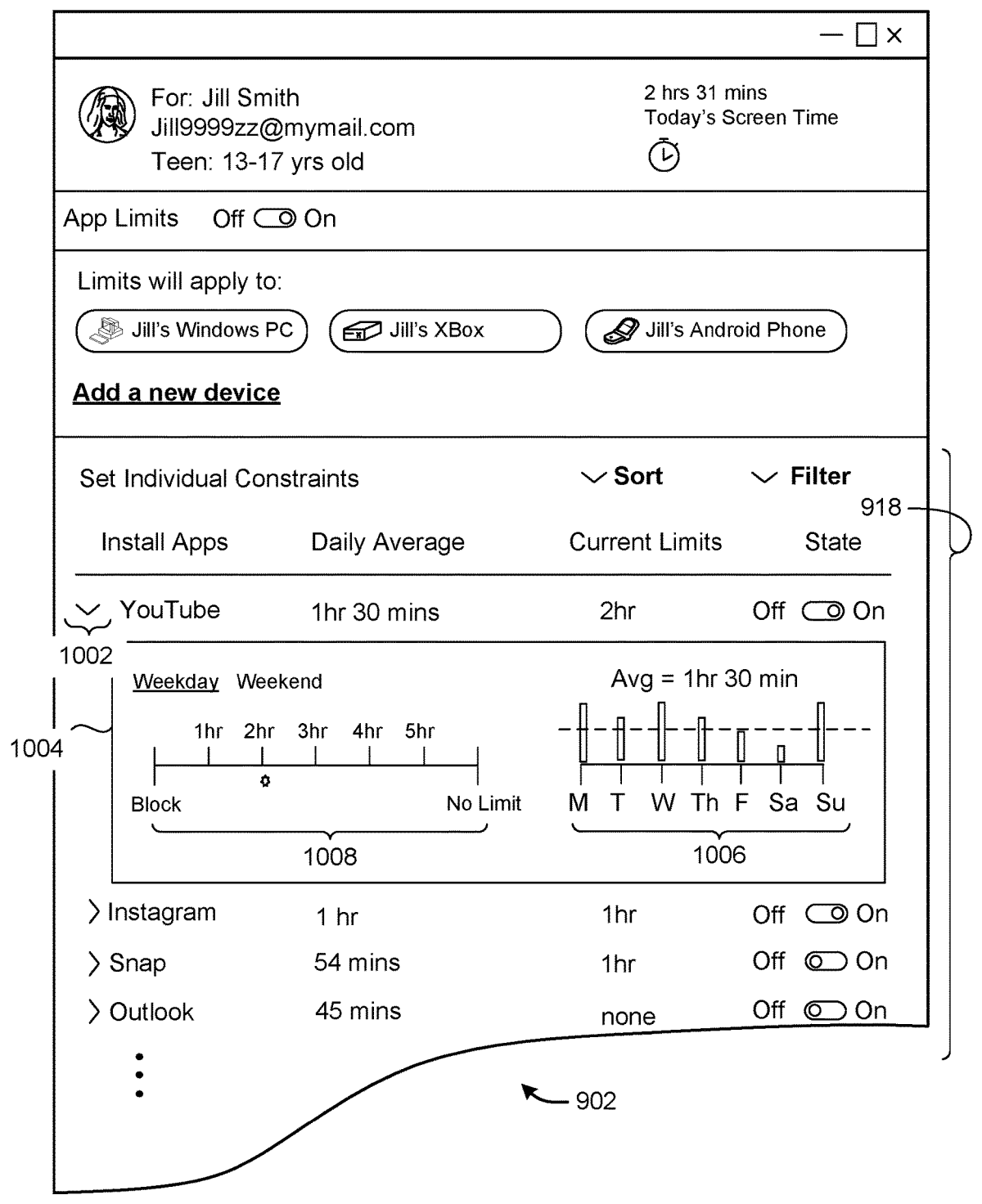

FIGS. 9 and 10 show a user interface (UI) presentation 902 that allows a supervisor to view and modify constraint information for a particular supervisee, Jill Smith, corresponding to a teenage daughter of the supervisor. A first section 904 of the UI presentation 902 provides information 906 regarding the supervisee. A second section 908 of the UI presentation 902 provides a control 910 that allows a supervisor to enable or disable constraint information for all applications.

A third section 912 of the UI presentation 902 provides information 914 that describes a group of supervisee computing devices associated with the supervisee, e.g., by providing an icon associated with each such supervisee computing device. In the more general case, however, the third section 912 provides information that describes a group of application execution platforms that run applications that the supervisee may access. These applications include applications locally installed by the supervisee computing devices, as well as applications that run on one or more network-accessible systems. However, to facilitate explanation, assume, in the example of FIG. 9, that the supervisee computing devices represent the entire set of application execution platforms. Note that any mention of a supervisee computing device below can be replaced with a more general reference to an application execution platform.

Although not shown, the third section 912 can also display alert information in association any icon when a corresponding supervisee computing device is not operating as expected. For example, the third section 912 can display alert information when a supervisee computing device is not properly forwarding incremental usage signals to the usage-synchronizing component 140 that reflect the supervisee's use of applications on that device. The third section 912 also includes a graphical prompt 916 that invites the supervisor to manually add a new supervisee computing device to the group of supervisee computing devices.

A fourth section 918 of the UI presentation 902 lists applications currently installed on the group of supervisee computing devices 104 (or more generally, the applications that run on different application execution platforms to which the supervisee has access). As noted above, the UI presentation 902 provides a single entry in this list for each application, even though two or more versions of that application may be installed on different supervisee computing devices in the group of supervisee computing devices 104.

The fourth section 918 can display any information for each application to which the supervisee has access. Without limitation, in a first column 920, the fourth section 918 displays a name associated with the application (which, in turn can be provided by the lookup data store 126 or another lookup table). In a second column 922, the fourth section 918 displays the average daily amount of time that the supervisee spends interacting with the application. In a third column 924, the fourth section 918 displays the total amount of time (if any) that has been allotted by the supervisor for the supervisee to interact with the application. In a fourth column 926, the fourth section 918 provides an individual control for each application that allows the supervisor to enable or disable the constraint that applies to the application, without affecting the constraints that apply to other applications.

A sort-specification control 928 allows the supervisor to order the entries in the list based on one or more sort factors, such application name, usage amount (greatest to least, or least to greatest), installation date (or other type of initiation date that identifies when the user gained access to the application), and so on. A filter-specification control 930 allows the supervisor to display a subset of applications that satisfy one or more filter factors. For instance, the supervisor may interact with the filter-specification control 930 to display only those applications that have constraint information associated therewith. Or the supervisor may interact with the filter-specification control 930 to drill down on applications installed on or otherwise accessible to particular supervisee computing devices, or, more generally, to particular application execution platforms.

FIG. 10 shows a mechanism by which a supervisee may modify constraint information. For example, assume that the supervisor wishes to change the allotted time in which the supervisee is permitted to interact with the YouTube application. To do so, the supervisor can click on the entry associated with this application in the fourth section 918, or the supervisor can more specifically click on an expand icon 1002 associated with this entry. This action causes the constraint-managing component 120 to present a panel 1004 below the entry. The panel 1004 includes usage information 1006 regarding the supervisee's use of the YouTube application over the last week. Or the usage information 1006 may present details the supervisee's average per-day usage of the YouTube application over the course of a week. The panel 1004 also includes a constraint-specification control 1008 that allows a supervisor to set a new time limit for the YouTube application. In this merely illustrative case, the supervisor sets the new time limit by moving a marker to a desired position within a graphical depiction of a span of time. Further, in this illustrative case, the constraint-specification control 1008 allows the supervisor to set a first limit for the supervisee's weekday consumption of the application, and a second limit for the supervisee's weekend consumption of the application. Note that the term "constraint-specification control," as used herein, also refers, in aggregate, to the entire set of constraint-specification controls associated with respective individual applications.

In other scenarios (not shown), the UI presentation 902 can allow the supervisor to view and modify other types of constraints, in addition to time limit constraints or instead of time limit constraints. For example, the supervisor can specify any of: the application functions a supervisee is permitted to interact with; the content items a supervisee is permitted to access; the people with whom the supervisee is permitted to interact with; the times at which the supervisee is permitted to perform specified application activity; a number of application actions that a supervisee is permitted to perform (such as a number of messages that a supervisee is permitted to send or receive); an amount of money that a supervisee is permitted to spend via an application, and so on.

In still another case, the UI presentation 902 can include another listing that provides information regarding the aggregate usage associated with different categories of applications (instead of, or in addition, to individual applications). The UI presentation 902 can also include another constraint-specification control that allows a supervisor to set category constraint information for each category of applications. The category constraint information, once set, applies to all versions of applications in a category of applications, across plural application execution platforms.

For example, the fourth section 918 can include a listing for a games category, a social media category, a video category, and a homework tools category. Consider the games category as an example. The games category can encompass two or more applications that provide games. The fourth section 918 can display usage information for the games category that describes the aggregate amount of time that the supervisee has spent interacting with the group of game applications. The fourth section 918 can include a constraint-specification control that allows the supervisor to specify a time limit for the games category. The time limit, once set, provides a total amount of time that the supervisee can spend interacting with the group of game applications, across plural application execution platforms.

To provide the above-described category information, the lookup data table 126 can be optionally adapted to map a platform-specific identifier (e.g., $ID_{A1P1}$) to a category identifier (e.g., $CID_{games}$) associated with an application A1. The constraint-managing component 120 can be optionally adapted to store constraint information for the category $CID_{games}$. And the usage-synchronizing component 140 can be adapted to provide a category counter for each category that records the total amount of time that the supervisee has spent interacting with the applications in that category. One way to generalize FIGS. 9 and 10 is to say that an application name can refer to a discrete individual application (that is, a single program) or a family of applications that have an identified relation.

In an alternative implementation, the lookup data store 126 can store information regarding the category of each application, e.g., as shown in FIG. 1. Based on this information, the enforcement component 118 can compute the total amount of activity that has taken place with respect to a category of applications by summing the count values for applications associated with the category under consideration. In this case, the lookup data store 126 can omit separate counters for category information.

Figure 11:
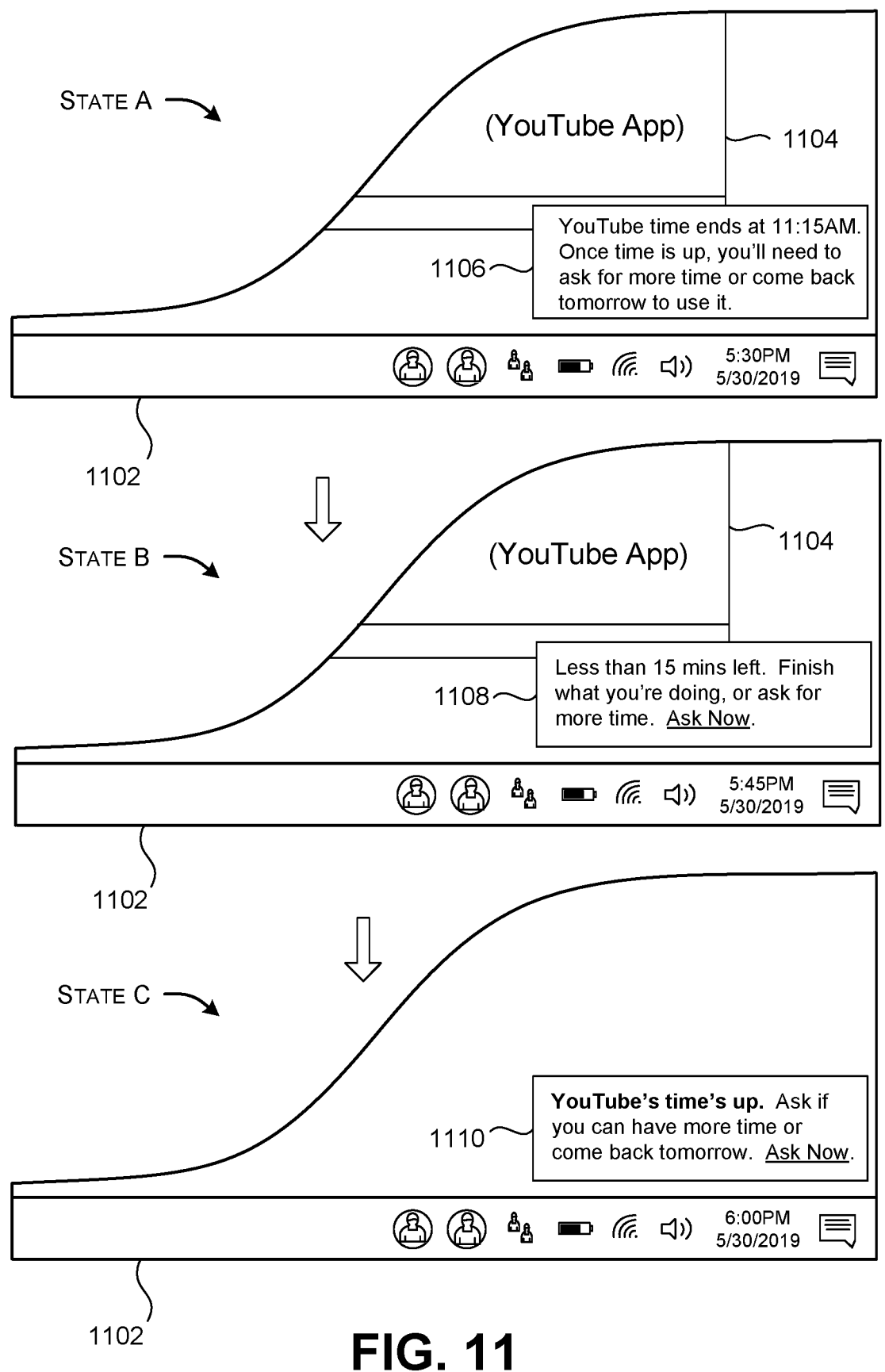
FIG. 11 shows a sequence of user interface presentations provided to a supervisee in the course of the supervisee's interaction with an application.

FIG. 11 shows a sequence of user interface (UI) presentations provided to the supervisee in the course of the supervisee's interaction with an application, such as the YouTube application. In state A, the enforcement component 118 presents a UI presentation 1102 when the supervisee first activates the application. The UI presentation 1102 shows content 1104 provided by the application. The UI presentation 1102 also provides a message 1106 that alerts the supervisee that a limit applies to her consumption of the application, and that the time runs out at a specified time. In state B, the enforcement component 118 presents a message 1108 that informs the supervisee that she has only 15 minutes left. More generally, the enforcement component 118 can provide update messages at any configurable frequency (such as every 15 minutes). Further, the enforcement component 118 can increase the frequency of messages as the ending time draws near. In state C, the enforcement component 118 disables the application because the remaining time has reached zero. The enforcement component 118 also sends a message 1110 that informs the supervisee that the allotted time has expired. The message 1110 also invites the supervisee to send a request to the supervisor, asking the supervisor to grant additional time.

Figure 12:
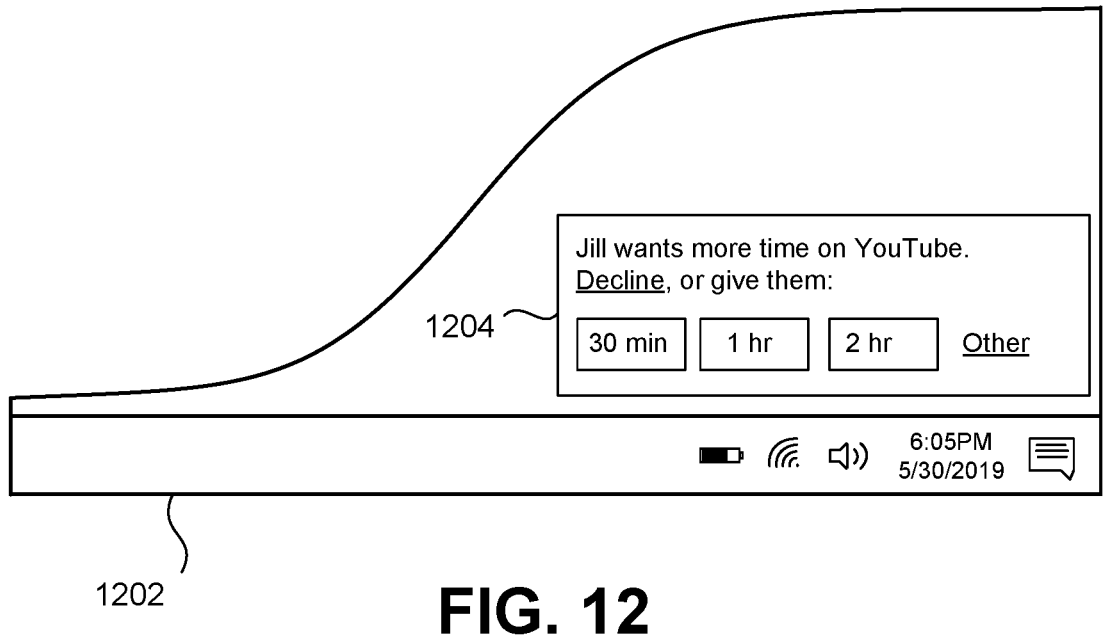
FIG. 12 shows a user interface presentation that invites the supervisor to add more time to a supervisee's daily allotment of time for an application.
Figure 13:
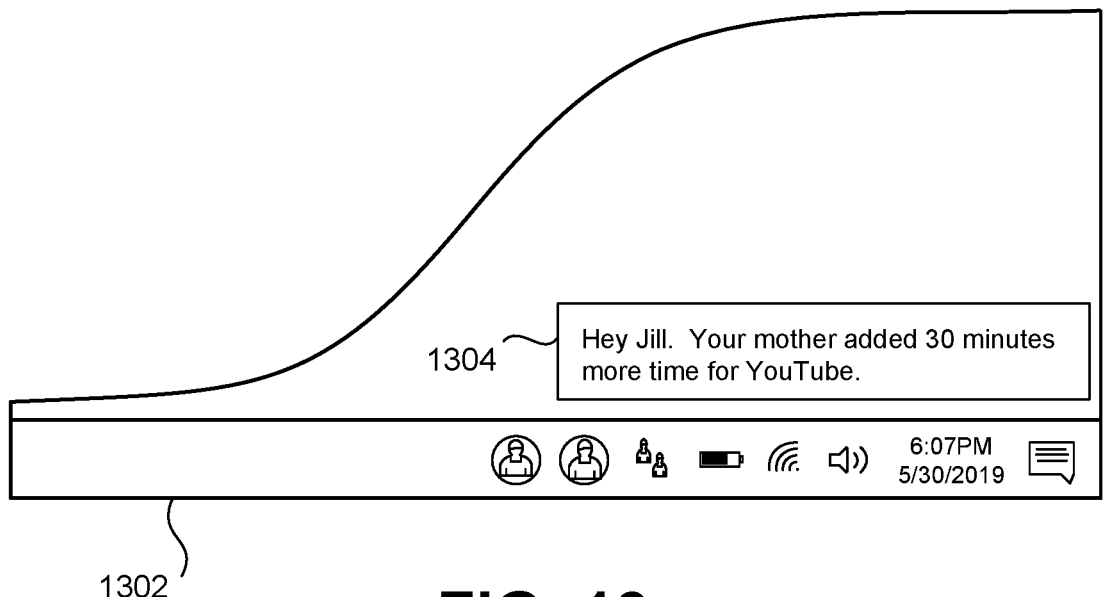
FIG. 13 shows a user interface presentation that informs the supervisee of the action taken by the supervisor in the user interface presentation of FIG. 12.

FIG. 12 shows a UI presentation 1202 (provided by the user interface component 144 of the supervisor computing device 124) that presents a message 1204 that invites the supervisor to add more time to a supervisee's daily allotment of time for an application. FIG. 13 shows a UI presentation 1302 (provided by the enforcement component 118) that provides a message 1304 that informs the supervisee of the action taken by the supervisor in the UI presentation 1202 of FIG. 12.

Note that the user interface presentations of FIGS. 11-13 are presented in the spirit of illustration, not limitation. Other implementations can use different notification techniques to provide information to the supervisee and the supervisor. For instance, in another implementation, the enforcement component 118 can provide a voice message that notifies the supervisee of the time that remains in which she is permitted to interact with the application.

B. Illustrative Processes

FIGS. 14-16 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 14 shows a process 1402 for controlling interaction with an application from the standpoint of the constraint-managing component 120. In block 1404, the constraint-managing component 120 identifies a particular version of an application to which the supervisee has access via a supervisee computing device 106, the particular version of the application running on a particular application execution platform, the particular version being associated with an identifier that identifies the particular version of the application. In block 1406, the constraint-managing component 120 consults the lookup data store 126 to map the identifier associated with the particular version of the application to platform-agnostic constraint information, the platform-agnostic constraint information applying to interaction by the supervisee with plural versions of the application associated with plural respective application execution platforms. In block 1408, the constraint-managing component 120 controls use of the particular version of the application by the supervisee based on the platform-agnostic constraint information.

FIG. 15 shows a process 1502 for controlling interaction with an application from the standpoint of a supervisee computing device 106. In block 1504, the supervisee computing device 106 receives platform-agnostic constraint information from the constraint-managing component 120, the platform-agnostic constraint information applying to interaction by a supervisee with plural versions of an application associated with plural respective application execution platforms. Assume that the supervisee interacts with a particular version of the application running on a particular application execution platform. In block 1506, the supervisee computing device 106 controls use of the particular version of the application based on the platform-agnostic constraint information.

FIG. 16 shows a process 1602 for managing use of an application from the standpoint of a supervisor computing device 124. In block 1604, the supervisor computing device 124 provides a user interface presentation to a supervisor. The user interface presentation includes: a listing of applications that run on different application execution platforms; and a constraint-specification control that allows the supervisor to set platform-agnostic constraint information for each application in the listing, the platform-agnostic constraint information, once set for an application, constraining interaction by a supervisee with all versions of the application running on plural application execution platforms. In block 1606, the supervisor computing device 124 receives input from the supervisor that expresses new platform-agnostic constraint information, in response to interaction by the supervisor with the constraint-specification control. In block 1606, the supervisor computing device 124 sends a setting signal to the constraint-managing component 120 that specifies the new platform-agnostic constraint information, the constraint-managing component 120 storing the new platform-agnostic constraint information in a data store 122.

C. Representative Computing Functionality

Figure 17:
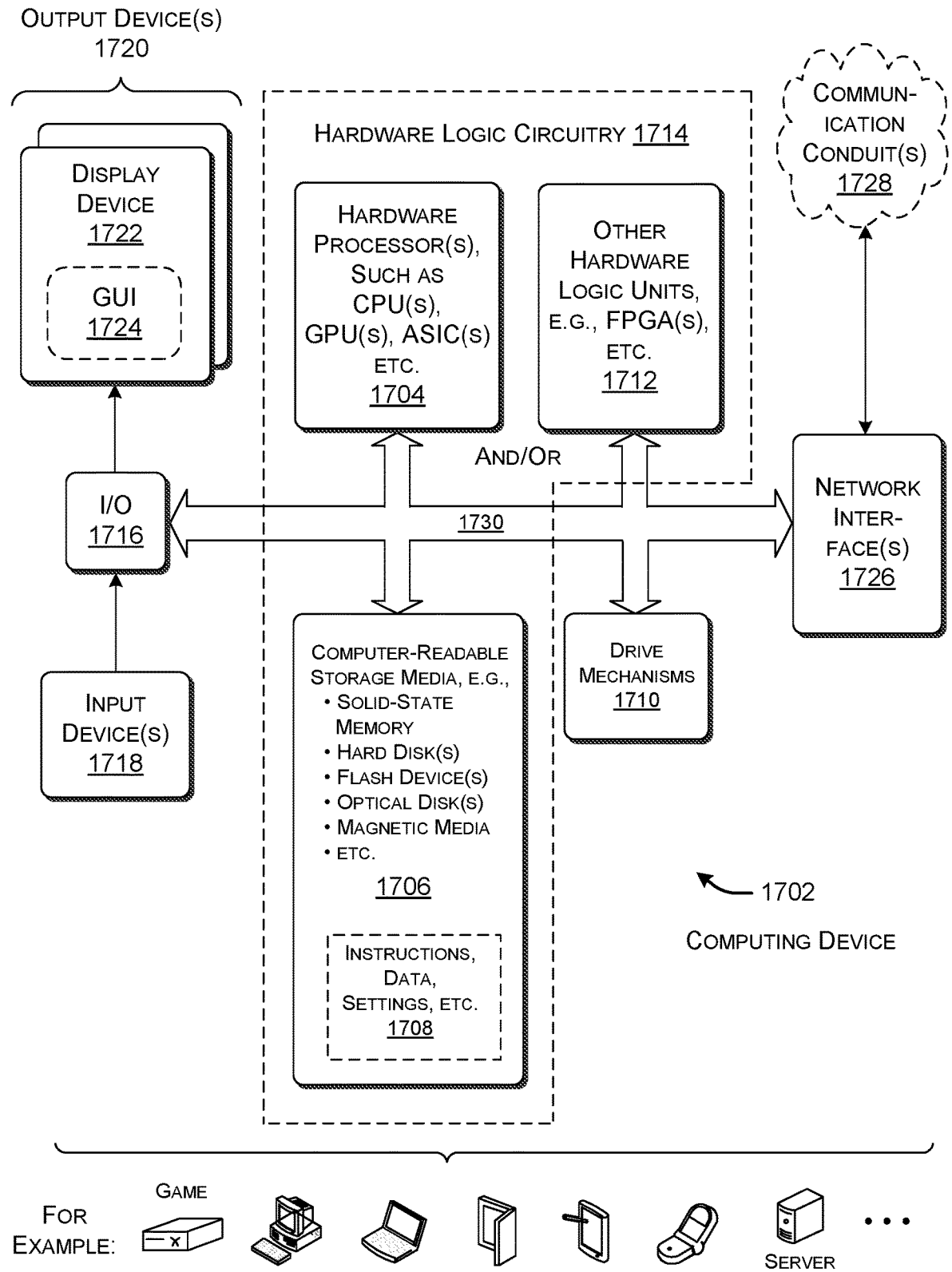
FIG. 17 shows an illustrative type of computing device that can be used to implement any aspect of the features shown in the foregoing drawings.

FIG. 17 shows a computing device 1702 that can be used to implement any aspect of the mechanisms set forth in the above-described figures. For instance, with reference to FIGS. 1 and 2, the type of computing device 1702 shown in FIG. 17 can be used to implement any supervisee computing device, any supervisor computing device, or any server. In all cases, the computing device 1702 represents a physical and tangible processing mechanism.

The computing device 1702 can include one or more hardware processors 1704. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable unit of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms 1710 (such as a hard drive mechanism) for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic units 1712 to perform operations using a task-specific collection of logic gates. For instance, the hardware logic unit(s) 1712 may include a fixed configuration of hardware logic gates, e.g., that are created and set at the time of manufacture, and thereafter unalterable. Alternatively, or in addition, the other hardware logic unit(s) 1712 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 includes any combination of the hardware processor(s) 1704, the computer-readable storage media 1706, and/or the other hardware logic unit(s) 1712. That is, the computing device 1702 can employ any combination of the hardware processor(s) 1704 that execute machine-readable instructions provided in the computer-readable storage media 1706, and/or one or more other hardware logic unit(s) 1712 that perform operations using a fixed and/or programmable collection of hardware logic gates. More generally stated, the hardware logic circuitry 1714 corresponds to one or more hardware logic units of any type(s) that perform operations based on logic stored in and/or otherwise embodied in the hardware logic unit(s).

In some cases (e.g., in the case in which the computing device 1702 represents a user computing device), the computing device 1702 also includes an input/output interface 1716 for receiving various inputs (via input devices 1718), and for providing various outputs (via output devices 1720). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1722 and an associated graphical user interface presentation (GUI) 1724. The display device 1722 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1702 can also include one or more network interfaces 1726 for exchanging data with other devices via one or more communication conduits 1728. One or more communication buses 1730 communicatively couple the above-described units together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. FIG. 17 shows illustrative form factors in its bottom portion. In other cases, the computing device 1702 can include a hardware logic unit that integrates the functions of two or more of the units shown in FIG. 1. For instance, the computing device 1702 can include a system on a chip (SoC or SOC), corresponding to an integrated circuit that combines the functions of two or more of the units shown in FIG. 17.

The following summary provides a non-exhaustive set of illustrative aspects of the technology set forth herein.

According to a first aspect, one or more computing devices for managing use of an application by a supervisee are described. The computing device(s) include hardware logic circuitry that provides: (a) one or more hardware processors that perform operations by executing machine-readable instructions stored in a memory, and/or (b) one or more other hardware logic units that perform operations using a task-specific collection of logic gates. The operations include: identifying a particular version of an application to which a supervisee has access via a supervisee computing device, the particular version of the application running on a particular application execution platform, the particular version being associated with an identifier that identifies the particular version of the application; consulting a lookup data store to map the identifier associated with the particular version of the application to platform-agnostic constraint information, the platform-agnostic constraint information applying to interaction by the supervisee with plural versions of the application associated with plural respective application execution platforms; and controlling use of the particular version of the application by the supervisee based on the platform-agnostic constraint information.

According to a second aspect, at least two of the application execution platforms use different respective kinds of operating systems.

According to a third aspect, at least one application execution platform corresponds to a network-accessible application in conjunction with a browser component that is used to access the network-accessible application.

According to a fourth aspect, the platform-agnostic constraint information specifies a permitted amount of an activity that the supervisee is permitted to perform across all versions of the application.

According to a fifth aspect, relating to the fourth aspect, the platform-agnostic constraint information expresses the permitted amount of the activity as a total amount of time that the supervisee is permitted to use the plural versions of the application, in aggregate.

According to a sixth aspect, relating to the fourth aspect, the operations further include: receiving an incremental usage signal from the supervisee computing device that specifies an incremental amount of activity performed by the supervisee in interacting with the particular version of the application; in response to the incremental usage signal, incrementing a counter that identifies a total amount of activity that the supervisee has performed in interacting with all versions of the application; and sending a usage response signal to the supervisee computing device that specifies the total amount of activity that the supervisee has performed.

According to a seventh aspect, relating to the sixth aspect, the operations further include repeating the operations of receiving an incremental usage signal and sending a usage response signal at least one time during interaction by the supervisee with the particular version of the application.

According to an eighth aspect, the operations further include receiving a setting signal from a supervisor computing device that expresses new platform-agnostic constraint information, in response to interaction by the supervisor with a user interface presentation provided by the supervisor computing device.

According to a ninth aspect, relating to the ninth aspect, the user interface presentation provides: a listing of applications running on plural application execution platforms; and a constraint-specification control that allows the supervisor to specify the new platform-agnostic constraint information for any application in the listing.

According to a tenth aspect, a method, performed by one or more computing devices, is described for managing use of an application. The method includes providing a user interface presentation to a supervisor. The user interface presentation includes: a listing of applications that run on different application execution platforms; and a constraint-specification control that allows the supervisor to set platform-agnostic constraint information for each application in the listing, the platform-agnostic constraint information, once set for an application, constraining interaction by a supervisee with all versions of the application running on plural application execution platforms. The method further includes: receiving input from the supervisor that expresses new platform-agnostic constraint information, in response to interaction by the supervisor with the constraint-specification control; and sending a setting signal to a constraint-managing component that specifies the new platform-agnostic constraint information, the constraint-managing component storing the new platform-agnostic constraint information in a data store.

According to an eleventh aspect, relating to the tenth aspect, the user interface presentation further includes usage information that specifies, for each application in the listing, a usage total that expresses a total amount of activity performed by the supervisee across all of the application execution platforms.

According to a twelfth aspect, relating to the tenth aspect, the user interface presentation further includes a filter-specification control that allows the supervisor to restrict the listing to applications that run on a specified set of application execution platforms.

According to a thirteenth aspect, relating to the eleventh aspect, the user interface presentation includes another constraint-specification control that allows the supervisor to set category constraint information for a category of applications, the category constraint information applying to all versions of applications in the category of applications that run on plural application execution platforms.

According to a fourteenth aspect, relating to the eleventh aspect, the method further includes: receiving a usage request signal from the supervisee that requests modification to the platform-agnostic constraint information; and presenting information regarding the usage request signal to the supervisor in a user interface presentation.

According to a fifteenth aspect, a computer-readable storage medium for storing computer-readable instructions is described. The computer-readable instructions, when executed by one or more hardware processors, perform a method that includes: receiving platform-agnostic constraint information from a constraint-managing component, the platform-agnostic constraint information applying to interaction by a supervisee with plural versions of an application associated with plural respective application execution platforms, the supervisee interacting with a particular version of the application running on a particular application execution platform; and controlling use of the particular version of the application based on the platform-agnostic constraint information.

According to a sixteenth aspect, relating to the fifteenth aspect, the platform-agnostic constraint information specifies a permitted amount of an activity that the supervisee is permitted to perform across all versions of the application.

According to a seventeenth aspect, relating to the sixteenth aspect, the platform-agnostic constraint information expresses the permitted amount of the activity as a total amount of time that the supervisee is permitted to use the plural versions of the application, in aggregate.

According to an eighteenth aspect, relating to the seventeenth aspect, the method further includes: sending an incremental usage signal to a usage-synchronizing component that specifies an incremental amount of activity performed by the supervisee in interacting with the particular version of the application; receiving a usage response signal from the usage-synchronizing component that specifies the total amount of activity that the supervisee has performed in interacting with all versions of the application; generating a measure of a remaining amount of activity that a user can perform in interacting with all versions of the application, based on the permitted amount of activity and the total amount of activity; and presenting a user interface presentation to the supervisee that alerts the supervisee to the remaining amount of activity.

According to a nineteenth aspect, relating to the eighteenth aspect, the operation of controlling includes prohibiting the supervisee from interacting with the particular version of the application when the remaining amount of activity is zero.

According to a twentieth aspect, relating to the eighteenth aspect, the method further includes: sending usage request signal to a supervisor computing device that expresses a request by the supervisee for an additional amount of activity to be added to the permitted amount of activity; and receiving a response to the usage request signal when the supervisor approves the request by the supervisee for an additional amount of activity.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for managing use of an application by a supervisee, comprising:
   hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
   receiving a request signal from a supervisee computing device, the request signal identifying a particular version of the application to which the supervisee has access via the supervisee computing device, the particular version of the application running on a particular application execution platform, the particular version being associated with an identifier provided by the request signal that identifies the particular version of the application;
   upon receipt of the request signal, consulting a lookup data store to map the identifier associated with the particular version of the application to platform-agnostic constraint information, the platform-agnostic constraint information applying to interaction by the supervisee with plural versions of the application associated with plural respective application execution platforms;
   providing a response signal to the supervisee computing device, the response signal specifying the platform-agnostic constraint information for use by the supervisee computing device in locally controlling the use of the particular version of the application by the supervisee; and
   as the supervisee interacts with the particular version of the application, incrementing a total amount of activity that the supervisee has performed in a course of interacting with the plural versions of the application.

2. The one or more computing devices of claim 1, wherein at least two of the application execution platforms use different respective kinds of operating systems.

3. The one or more computing devices of claim 1, wherein at least one application execution platform corresponds to a network-accessible application in conjunction with a browser component that is used to access the network-accessible application.

4. The one or more computing devices of claim 1, wherein the platform-agnostic constraint information specifies a permitted amount of an activity that the supervisee is permitted to perform across the plural versions of the application.

5. The one or more computing devices of claim 4, wherein the platform-agnostic constraint information expresses the permitted amount of the activity as a total amount of time that the supervisee is permitted to use the plural versions of the application, in aggregate.

6. The one or more computing devices of claim 1, wherein said incrementing includes:
receiving an incremental usage signal from the supervisee computing device that specifies an incremental amount of activity performed by the supervisee in interacting with the particular version of the application;
in response to the incremental usage signal, incrementing a counter that identifies the total amount of activity that the supervisee has performed in interacting with the plural versions of the application; and
sending a usage response signal to the supervisee computing device that specifies the total amount of activity that the supervisee has performed.

7. The one or more computing devices of claim 6,
wherein the incremental amount of activity refers to an incremental amount of time that the supervisee has spent interacting with the particular version of the application, and
wherein the total amount of activity refers to a total amount of time that the supervisee has spent using the plural versions of the application, in aggregate.

8. The one or more computing devices of claim 6,
wherein the incremental usage signal includes the identifier that identifies the particular version of the application, and
wherein the operations further include using the lookup data store to map the identifier to the counter that is incremented.

9. The one or more computing devices of claim 1, wherein the operations further include repeating said incrementing at least one time during interaction by the supervisee with the particular version of the application.

10. The one or more computing devices of claim 1,
wherein the identifier is a particular version-specific identifier that is one of a group of version-specific identifiers that are respectively associated with the plural versions of the application that run on the respective application execution platforms,
wherein the lookup data store also includes a platform-agnostic identifier that represents the application, independent of execution platform, and
wherein said consulting uses the lookup data store to find the platform-agnostic identifier that is associated with the particular version-specific identifier.

11. A method, performed by one or more computing devices, for managing use of an application, comprising:
providing a user interface presentation to a supervisor, the user interface presentation including:
a listing of applications that run on different application execution platforms;
a constraint-specification control that allows the supervisor to set platform-agnostic constraint information for each application in the listing, the platform-agnostic constraint information, once set for a particular application, constraining interaction by a supervisee with plural versions of the particular application running on plural application execution platforms; and
usage information that specifies, for the particular application in the listing, a usage total that expresses a total amount of activity performed by the supervisee across the particular application including activities across different ones of the plural versions of the particular application, the usage total being incremented in a course of the supervisee interacting with each version of the particular application;
receiving input from the supervisor that expresses new platform-agnostic constraint information, in response to interaction by the supervisor with the constraint-specification control; and
sending a setting signal to a constraint-managing component that specifies the new platform-agnostic constraint information, the constraint-managing component storing the new platform-agnostic constraint information in a data store.

12. The method of claim 11, wherein the total amount of activity refers to a total amount of time that the supervisee has spent using the plural versions of the particular application, in aggregate.

13. A computer-readable storage medium for storing computer-readable instructions, the computer-readable instructions, when executed by one or more hardware processors, performing a method that comprises: receiving platform-agnostic constraint information from a constraint-managing component, the platform-agnostic constraint information applying to interaction by a supervisee with plural versions of an application associated with plural respective application execution platforms, the supervisee interacting with a particular version of the application running on a particular application execution platform; and controlling use of the particular version of the application based on the platform-agnostic constraint information, wherein the platform-agnostic constraint information specifies a permitted amount of an activity that the supervisee is permitted to perform across the plural versions of the application, wherein the method further includes: sending an incremental usage signal to a usage-synchronizing component that specifies an incremental amount of activity performed by the supervisee in interacting with the particular version of the application; receiving a usage response signal from the usage-synchronizing component that specifies a total amount of activity that the supervisee has performed in interacting with the plural versions of the application including activities across different ones of the plural versions of the application; generating a measure of a remaining amount of activity that the supervisee can perform in interacting with the plural versions of the application, based on the permitted amount of activity and the total amount of activity; and presenting a user interface presentation to the supervisee that alerts the supervisee to the remaining amount of activity.

14. The computer-readable storage medium of claim 13, wherein the platform-agnostic constraint information expresses the permitted amount of the activity as a total amount of time that the supervisee is permitted to use the plural versions of the application, in aggregate.

15. The computer-readable storage medium of claim 13, wherein said controlling includes prohibiting the supervisee from interacting with the particular version of the application when the remaining amount of activity is zero.

16. The computer-readable storage medium of claim 13, wherein the method further includes:
sending a usage request signal to a supervisor computing device that expresses a request by the supervisee for an additional amount of activity to be added to the permitted amount of activity; and
receiving a response to the usage request signal when the supervisor approves the request by the supervisee for an additional amount of activity.

17. The computer-readable storage medium of claim 13,
wherein the incremental amount of activity refers to an incremental amount of time that the supervisee has spent interacting with the particular version of the application, and
wherein the total amount of activity refers to a total amount of time that the supervisee has spent using the plural versions of the application, in aggregate.

18. The computer-readable storage medium of claim 13, wherein the particular version of the application is associated with a particular identifier, and wherein the usage-synchronizing component uses a lookup table to map the particular identifier to the total amount of activity.

19. The computer-readable storage medium of claim 18,
wherein the particular identifier is one of a group of version-specific identifiers that are respectively associated with the plural versions of the application that run on the respective application execution platforms, and
wherein the lookup table also includes a platform-agnostic identifier that represents the application, independent of execution platform.

* * * * *